United States Patent Office 2,944,137
Patented July 5, 1960

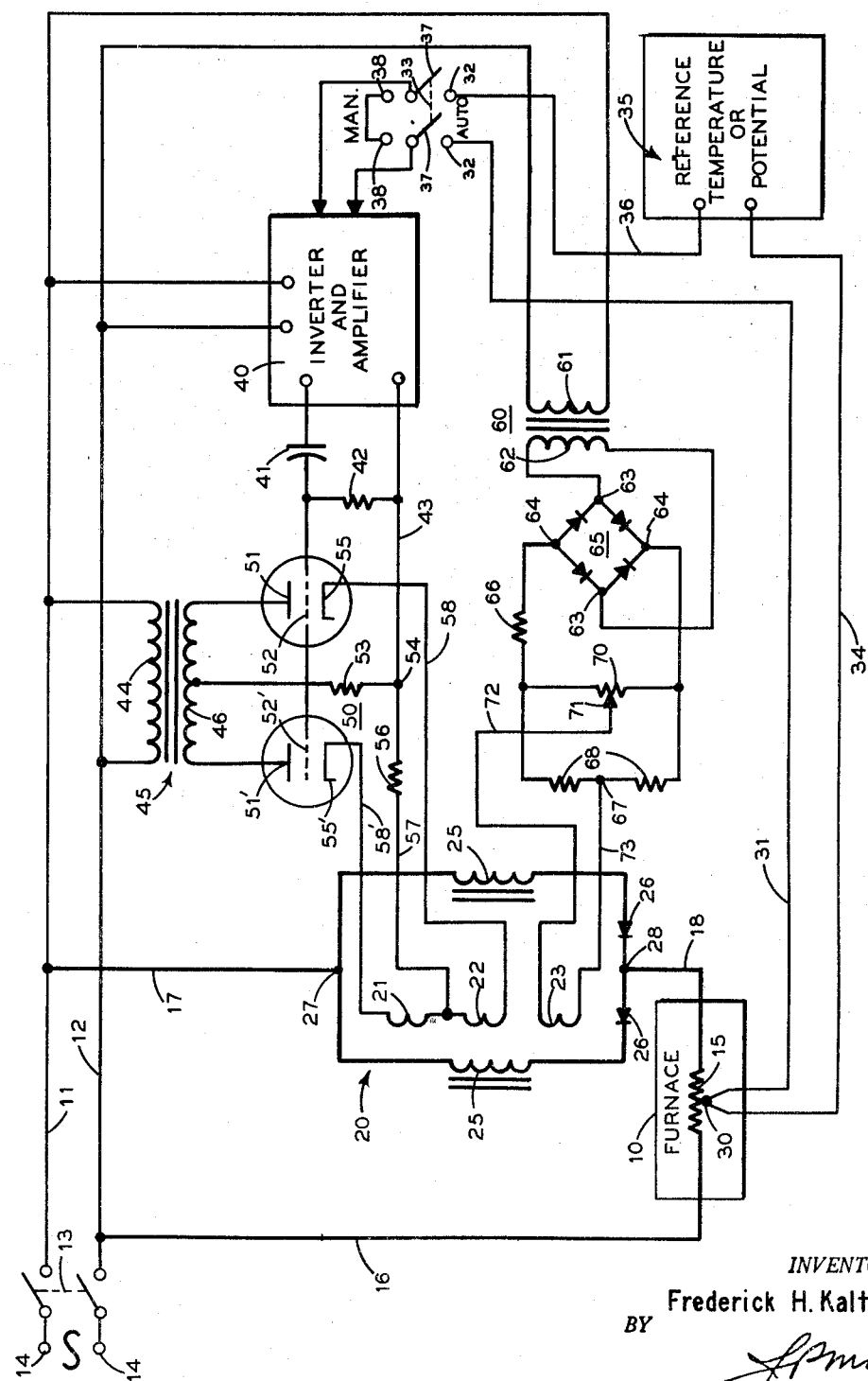

2,944,137

SELF STABILIZING AUTOMATIC TEMPERATURE CONTROL

Frederick H. Kaltenbach, Alliance, Ohio, assignor to The Babcock & Wilcox Company, New York, N.Y., a corporation of New Jersey Filed Mar. 18, 1959, Ser. No. 800,305

8 Claims. (Cl. 219—20)

This invention relates to automatic temperature controls and, more particularly, to an electronic automatic temperature control system employing a novel combination of circuitry components providing remarkably increased sensitivity and stability of control, particularly at relatively high temperatures, and irrespective of temperature changes in resistance and of supply line changes.

One of the chief problems in accurate determination and control of temperature is the variation in readings or control signals due to changes in resistance of circuit components resulting from changes in temperature. Many proposals have been made for compensating these changes, such as, for example, the use of resistance materials having negative temperature coefficients of resistivity in combination with materials having positive coefficients of resistivity, and the use of highly specialized bridge circuits.

Such arrangements as hitherto proposed have not been satisfactory for many applications, such as those where stability of response over extended periods of continuous use is required and those where the involved temperatures are of the order of 1000° F. or greater. The aging or malfunction of components after extended periods of use, or when the involved temperatures are of such high values, has seriously detracted from the practical utility of such arrangements at least in these particular applications.

Another major problem is that of fluctuations in supply line voltages and current. While the voltage fluctuations can be stabilized, within limits, by the use of voltage stabilizer circuits and devices, such expedients add to the initial cost and maintenance cost of the temperature control circuits.

In accordance with the present invention, the disadvantageous effects of changes in resistance due to changes in temperature and of line fluctuations are eliminated by a novel combination of circuitry components. More specifically, the output voltage from a temperature detector, such as a thermocouple or other thermo-electric generator, is compared with a fixed reference potential, which may be the output of a second thermocouple or thermo-electric generator whose temperature is held at a constant value. Any difference between the two potentials is applied to the input of an inverter and amplifier which converts the D.C. input potential to an A.C. output potential having a magnitude and phase corresponding to the magnitude and polarity of the D.C. signal or differential potential.

The A.C. output voltage of the inverter, suitably amplified, is impressed on the grids of a phase detector comprising a pair of triode sections connected in push-pull relation. This creates an unbalanced condition, increasing the conductivity of one triode section and decreasing that of the other triode section.

Each of the two cathodes is connected to a different one of a pair of matched control windings of a magnetic amplifier, the other ends of the control windings being commonly connected to one output terminal of the amplifier section of the inverter-amplifier. Thus, the cathode currents introduce a corresponding unbalance into the magnetic amplifier, whose power windings control the flow of heating current to the control device. The magnetic amplifier adjusts the heating current flow to restore the temperature to a value where the output voltage of the control or detector thermocouple exactly balances the reference potential, resulting in no signal potential being applied to the inverter input.

The magnetic amplifier is provided with a third control winding for adjusting the system to bring the temperature of the controlled device into the range of the control circuit, this third winding having a D.C. potential impressed thereon from a full wave rectifier supplied from the line.

For an understanding of the invention principles, reference is made to the following description of a typical embodiment thereof as illustrated in the accompanying drawing. In the drawing, the single figure is a part schematic and part block wiring diagram of the automatic temperature control.

Referring to the drawing, the temperature control is illustrated as arranged to maintain constant the temperatures of an electric heating furnace 10 having a heating resistance 15 supplied with current from supply conductors 11, 12 connected through a double pole switch 13 to terminals 14 having an A.C. potential applied thereto. A conductor 16 connects one end of resistance 15 to supply conductor 12. The opposite end of resistance 15 is connected to supply conductor 11 in series with a magnetic amplifier 20 having a terminal 27 connected to conductor 11 by a conductor 17 and a terminal 28 connected to resistance 15 by a conductor 18.

Magnetic amplifier 20 includes A.C. energized power coils 25, 25 connected in parallel between terminals 27 and 28, each power coil being connected to terminal 28 through a rectifier 26, 26. Rectifiers or diodes 26, 26 are so connected as to provide for current flow in opposite directions through each coil 25 so that only one coil 25 has an effective current flow therethrough during each half cycle, the respective coils conducting on alternate half cycles. For a purpose to be described, the current flow through coils 25, 25 is controlled by three D.C. energized control coils 21, 22 and 23.

A temperature responsive potential generating device, or thermo-electric generator, such as a thermocouple 30, is operatively associated with furnace heating resistance 15. A conductor 31 connects one terminal of thermocouple 30 directly to one terminal 32 of a double pole, double throw switch 33. The other terminal of thermocouple 30 is connected by conductor 34 to one terminal of a reference potential 35.

Source 35 may be either a second thermocouple maintained at a constant pre-set temperature, and thus developing a constant output potential, or a source of constant potential, such as a standard cell or a voltage regulated circuit. In either case, the potential developed by thermocouple 30 is applied in opposition to the constant fixed reference potential of source 35 and the differential signal potential is applied to terminals 32 of switch 33. This differential signal potential will have a polarity and magnitude dependent, respectively, upon whether the potential developed by thermocouple 30 is greater or less than such fixed potential and upon the magnitude of any difference between the potential of thermocouple 30 and the fixed reference potential.

Switch 33 is a "Manual-Automatic" selector switch. When its blades 37 are engaged with "Automatic" contacts 32, the differential signal potential is applied to the input of an inverter and amplifier unit 40. When blades 37 are engaged with interconnected "Manual" contacts 38, no signal potential is applied to the input of unit 40.

Inverter amplifier unit 40 may be any combination of an inverter and an amplifier capable of converting the D.C. signal potential at its input into a corresponding amplified A.C. output having a mangitude corresponding to the magnitude of the input signal potential and a relative phase dependent upon the relative polarity of the D.C. input signal potential. This amplified A.C. output signal is impressed on a phase detector generally indicated at 50, the output of inverter-amplifier 40 being coupled to the input of phase detector 50 through a condenser 41 and a resistance 42.

Phase detector 50 comprises a pair of triode sections including anodes 51, 51' grids 52, 52', and cathodes 55, 55'. Anode potential is provided by a transformer 45 having a primary winding 44 connected across supply conductors 11, 12 and a secondary winding 46 having its terminals connected to anodes 51, 51'. The midpoint of winding 46 is connected through resistance 53 to a junction point 54 connected by conductor 43 to inverter-amplifier unit 40, one terminal of resistance 42 being connected to conductor 43. Point 54 is connected through a resistance 56 and a conductor 57 to the common junction of the series connected opposing control windings 21, 22. The end of winding 21 is connected to cathode 55' by a conductor 58' and the end of winding 22 is connected to cathode 55 by a conductor 58.

The third control winding 23 is supplied with direct current at a manually pre-settable substantially constant value not dependent upon fluctuations in the temperature of furnace 10. For this purpose, a transformer 60 has its primary winding 61 supplied from conductors 11, 12 and its secondary winding 62 connected to opposite input terminals 63 of a full-wave rectifier 65. The output from terminals 64 of rectifier 65 is applied, through a series resistance 66, across a potentiometer 70. The adjustable contact 71 of potentiometer 70 is connected by a conductor 72 to one end of winding 23. A conductor 73 connects the other end of winding 23 to the midpoint 67 of a voltage divider 68 connected across potentiometer 70.

The automatic temperature control operates in the following manner. When the furnace 10 is energized by closing switch 13, contact 71 is adjusted to control the saturating effect of control coil 23 so as to adjust the current flow through the heating resistance to a value such that the furnace temperature is at a desired value within the control range of the system. Such control range can be varied for different applications by selection of circuit components having effective operating ranges in accordance with the range of temperatures of the particular furnace. The initial adjustment of potentiometer 70 preferably is effected with switch 33 either open or closed to the "Manual" position. Adjustment of component 35 is then effected to select either the desired furnace potential, if the reference element is a thermocouple, or a D.C. potential corresponding to the output of thermocouple 30 at the desired furnace temperature, if the reference element is a source of constant potential.

With switch 33 closed to the "Automatic" position, in which blades 37 engage contacts 32, any variation in the temperature of furnace 10 from the pre-set temperature will effect a corresponding variation in the output potential of thermocouple 30. The differential between this output potential and the potential of reference 35 is applied to inverter-amplifier 40, which develops an amplified A.C. output potential corresponding in magnitude to such differential potential and having a relative phase dependent upon the relative polarity of the differential potential.

This A.C. signal is impressed on both grids 52, 52'. As the two triode sections are 180 degrees out of phase with each other, the current through one section will increase and that through the other section will correspondingly decrease, creating a push-pull effect. As a result, the direct current flow through one of the matched control coils 21 or 22 will be increased and that through the other control coil will be decreased, thus introducing the push-pull unbalance into magnetic amplifier 20. The resultant variation in the current flow through power coils 25, 25' and winding 15 is in a direction such as to restore the furnace temperature to the pre-set value.

By virtue of the described circuit connections, and particularly the push-pull phase detector 50, any fluctuations due to resistance or line voltage changes are automatically compensated. Under test conditions, the automatic temperature control of the invention has controlled temperatures within less than 0.5° F. at a temperature of 1200° F.

While a specific embodiment of the invention has been shown and described in detail to illustrate the application of the invention principles, it will be understood that the invention may be embodied otherwise without departing from such principles.

What is claimed is:

1. Automatic temperature control apparatus for an electrically energized furnace, comprising, in combination, a thermo-electric generator developing a D.C. output potential proportional to the temperature of the furnace; a source of constant value D.C. reference potential, pre-settable as to such constant value, connected in opposing relation with said output potential; a source of A.C. potential; an inverter and amplifier unit energized from said A.C. source and operable to convert a D.C. input potential into an amplified A.C. output potential having a magnitude proportional to the magnitude of the input potential and a relative phase corresponding to the polarity of the input potential; means, including circuit connecitons, operable to impress on the input of said inverter and amplifier unit any signal potential difference between said D.C. output and reference potentials; a phase detector, including a pair of grid-controlled electronic valve sections, connected across said source of A.C. potential with said sections in phase opposition; means applying said amplified A.C. output potential to the grids of said sections in substantial phase coincidence; and a magnetic amplifier including power coil means controlling flow of current from said source of A.C. potential to said furnace, and a pair of matching control coils operatively associated with said power coil means to control saturation of the latter; said control coils being connected in series opposing relation and each operatively connected to said source of A.C. potential in series with a different one of said sections; whereby, responsive to any signal potential difference between said output and reference D.C. potentials due to variation of the furnace temperature from a pre-set value proportional to such pre-set value of reference potential, said control coils will be effectively energized in push-pull relation to vary the current flow through said power coil means in a direction to restore the furnace temperature to its pre-set value.

2. Automatic temperature control apparatus for an electrically energized furnace, comprising, in combination, a thermo-electric generator developing a D.C. output potential proportional to the temperature of the furnace; a source of constant value D.C. refernece potential, pre-settable as to such constant value, connected in opposing relation with said output potential; a source of A.C. potential; an inverter and amplifier unit energized from said A.C. source and operable to convert a D.C. input potential into an amplified A.C. output potential having a magnitude proportional to the magnitude of the input potential and a relative phase corresponding to the polarity of the input potential; means, including circuit connections, operable to impress on the input of said inverter and amplifier unit any signal potential difference between said D.C. output and reference potentials; a phase detector, including a pair of triode sections, connected across said source of A.C. potential with said sections in phase opposition; means applying said amplified A.C. output potential to the grids of said sections in substantial phase coincidence; and a magnetic amplifier including power coil means controlling flow of current from said source of A.C. potential to said furnace, and a pair of matching control coils operatively associated with said power coil means to control saturation of the latter; said control coils being connected in series opposing relation and each operatively connected to said source of A.C. potential in series with a different one of said sections; whereby, responsive to any signal potential difference between said output and reference D.C. potentials due to variation of the furnace temperature from a pre-set value proportional to such pre-set value of reference potential, said control coils will be effectively energized in push-pull relation to vary the current flow through said power coil means in a direction to restore the furnace temperature to its pre-set value.

3. Automatic temperature control apparatus for an electrically energized furnace, comprising, in combination, a thermo-electric generator developing a D.C. output potential proportional to the temperature of the furnace; a source of constant value D.C. reference potential, pre-settable as to such constant value, connected in opposing relation with said output potential; a source of A.C. potential; an inverter and amplifier unit energized from said A.C. source and operable to convert a D.C. input potential into an amplified A.C. output potential having a magnitude proportional to the magnitude of the input potential and a relative phase corresponding to the polarity of the input potential; means, including circuit connections, operable to impress on the input of said inverter and amplifier unit any signal potential difference between said D.C. output and reference potentials; a phase detector, including a pair of grid-controlled electronic valve sections, connected across said source of A.C. potential with said sections in phase opposition; means applying said amplified A.C. output potential to the grids of said sections in substantial phase coincidence; and a magnetic amplifier including power coil means controlling flow of current from said source of A.C. potential to said furnace, and a pair of matching control coils operatively associated with said power coil means to control saturation of the latter; said control coils being connected in series opposing relation and each connected to the cathode of a different one of said sections; whereby, responsive to any signal potential difference between said output and reference D.C. potentials due to variation of the furnace temperature from a pre-set value proportional to such pre-set value of reference potential, said control coils will be effectively energized in push-pull relation to vary the current flow through said power coil means in a direction to restore the furnace temperature to it pre-set value.

4. Automatic temperature control apparatus for an electrically energized furnace, comprising, in combination, a thermo-electric generator developing a D.C. output potential proportional to the temperature of the furnace; a source of constant value D.C. reference potential, pre-settable as to such constant value, connected in opposing relation with said output potential; a source of A.C. potential; an inverter and amplifier unit energized from said A.C. source and operable to convert a D.C. input potential into an amplified A.C. output potential having a magnitude proportional to the magnitude of the input potential and a relative phase corresponding to the polarity of the input potential; means, including circuit connections, operable to impress on the input of said inverter and amplifier unit any signal potential difference between said D.C. output and reference potentials; a phase detector, including a pair of triode sections, connected across said source of A.C. potential with said sections in phase opposition; means applying said amplified A.C. output potential to the grids of said sections in substantial phase coincidence; and a magnetic amplifier including power coil means controlling flow of current from said source of A.C. potential to said furnace, and a pair of matching control coils operatively associated with said power coil means to control saturation of the latter; said control coils being connected in series opposing relation and each connected to the cathode of a different one of said sections; whereby, responsive to any signal potential difference between said output and reference D.C. potentials due to variation of the furnace temperature from a pre-set value proportional to such pre-set value of reference potential, said control coils will be effectively energized in push-pull relation to vary the current flow through said power coil means in a direction to restore the furnace temperature to its pre-set value.

5. Automatic temperature control apparatus for an electrically energized furnace, comprising, in combination, a thermo-electric generator developing a D.C. output potential proportional to the temperature of the furnace; a source of constant value D.C. reference potential, pre-settable as to such constant value, connected in opposing relation with said output potential; a source of A.C. potential; an inverter and amplifier unit energized from said A.C. source and operable to convert a D.C. input potential into an amplified A.C. output potential having a magnitude proportional to the magnitude of the input potential and a relative phase corresponding to the polarity of the input potential; means, including circuit connections, operable to impress on the input of said inverter and amplifier unit any signal potential difference between said D.C. output and reference potentials; a phase detector, including a pair of grid-controlled electronic valve sections, connected across said source of A.C. potential with said sections in phase opposition; means applying said amplified A.C. output potential to the grids of said sections in substantial phase coincidence; a magnetic amplifier including power coil means controlling flow of current from said source of A.C. potential to said furnace, and a pair of matching control coils operatively associated with said power coil means to control saturation of the latter; said control coils being connected in series opposing relation and each operatively connected to said source of A.C. potential in series with a different one of said sections; whereby, responsive to any signal potential difference between said output and reference D.C. potentials due to variation of the furnace temperature from a pre-set value proportional to such pre-set value of reference potential, said control coils will be effectively energized in push-pull relation to vary the current flow through said power coil means in a direction to restore the furnace temperature to its pre-set value; a third control coil in saturation controlling relation with said power coil means; and manually adjustable means operable to apply an adjustable D.C. potential to said third control coil to initially pre-set the furnace temperature within the control range of the control apparatus.

6. Automatic temperature control apparatus as claimed in claim 5 in which said manually adjustable means comprise a rectifier connected across said source of A.C. potential, and a rheostat connected between the output of said rectifier and said third control coil.

7. Automatic temperature control apparatus as claimed in claim 1 in which said thermo-electric generator comprises a thermocouple.

8. Automatic temperature control apparatus as claimed in claim 1 in which said source of reference potential comprises a thermocouple maintained at an adjustable substantially constant temperature.

References Cited in the file of this patent
UNITED STATES PATENTS

| | | |
|---|---|---|
| 2,297,836 | Levy | Oct. 6, 1942 |
| 2,724,040 | Mouzon | Nov. 15, 1955 |
| 2,733,404 | Ogle | Jan. 31, 1956 |
| 2,829,231 | Troost | Apr. 1, 1958 |